(12) United States Patent
Svec et al.

(10) Patent No.: US 7,773,172 B2
(45) Date of Patent: Aug. 10, 2010

(54) LINE ATTENUATION TUNABLE OPTICAL FILTER

(75) Inventors: Christopher B. Svec, Palatine, IL (US); Douglas M. Essex, Elgin, IL (US)

(73) Assignee: Northrop Grumman Corporation, Los Angeles, CA (US)

( * ) Notice: Subject to any disclaimer, the term of this patent is extended or adjusted under 35 U.S.C. 154(b) by 1532 days.

(21) Appl. No.: 11/069,397

(22) Filed: Mar. 1, 2005

(65) Prior Publication Data
US 2007/0008455 A1 Jan. 11, 2007

(51) Int. Cl.
*G02F 1/1335* (2006.01)
(52) U.S. Cl. .......................... 349/62; 359/236
(58) Field of Classification Search ................. 385/140; 349/62, 104–106; 359/230, 234, 236, 577, 359/578, 586–589
See application file for complete search history.

(56) References Cited

U.S. PATENT DOCUMENTS

| | | | |
|---|---|---|---|
| 3,841,734 A * | 10/1974 | Kermode | 359/578 |
| 5,805,759 A | 9/1998 | Fukushima | |
| 5,852,498 A | 12/1998 | Youvan et al. | |
| 6,700,690 B1 | 3/2004 | Buchsbaum et al. | |
| 7,015,991 B2 * | 3/2006 | Conner et al. | 349/106 |
| 2002/0196569 A1 | 12/2002 | Eliahu-Niv et al. | |
| 2004/0057116 A1 | 3/2004 | Ogawa | |
| 2004/0136074 A1 | 7/2004 | Ford et al. | |

* cited by examiner

*Primary Examiner*—Sarah Song
(74) *Attorney, Agent, or Firm*—Stetina Brunda Garred & Brucker (57) ABSTRACT

A method and apparatus is provided for selectively attenuating narrowband high intensity bright sources from an incoming light source in an imaging system creating a focal plane array. The method comprises receiving and conditioning incoming light in a at least one group of optics; receiving the into a line attenuation tunable optical filter (LATOF) which creates a rejection band; tilting the LATOF at least one increment to selectively attenuate the bright sources from the receive conditioned light; receiving the conditioned light and selectively attenuated light into an opto-electronic detector; and converting the light into an output for an electronic image, wherein saturation of the focal plane array decreases and contrast is restored in the electronic image.

24 Claims, 6 Drawing Sheets

LATOF CONTROL LOGIC

LINE ATTENUATION TUNABLE OPTICAL FILTER

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention provides an imaging system and method for selectively attenuating narrow band bright sources which cause a focal plane array to saturate, in which as a result, image contrast is lost from the incoming light source. In particular, the present invention utilizes a tiltable line attenuation tunable optical filter (LATOF) within imaging systems to shift the center of the wavelength rejection band along the wavelength domain, if required, for continuously tuning and/or selectively attenuating the narrow band bright source, as required, so that contrast can be restored.

2. Background of the Invention

In an electronic imaging system, especially one with high optical gain, there is an inherent sensitivity to bright sources. These sources cause the focal plane array (FPA) to saturate, and as a result, image contrast is lost in the area of the source. In some cases this bright source is broadband; in others the bright source is narrowband. In an effort to restore contrast, various attempts have been made to attenuate the bright source, which are now herein briefly discussed.

The most common manner in which bright sources are attenuated in imaging systems is to utilize an automatic gain control (AGC) loop. The AGC loop monitors the electronic output from an opto-electronic detector and sets the gain of that signal to best display the scene with an optimal contrast. In the event that a bright source enters the frame, the AGC loop will reduce the gain of the signal in an attempt to get the pixels out of saturation to improve contrast. This reduction of the gain will reduce the contrast of the overall scene, even if the source only occupies a small fraction of the scene. In this situation, prior art typically "flips-in" a spectral filter that blocks the bright source spectrally, and allows the AGC to re-adjust the gain for better contrast. The short-fall with this approach is that the filter is broadband, blocking up to 70% of the incoming light signal as well providing compromised contrast, even at maximum gain.

Other approaches have been attempted to attenuate the bright source independent of AGC loops. For instance, there are a variety of filters which can be used to selectively attenuate the bright source. Attenuation filters are used to reduce the intensity of a light beam. High quality attenuation filters are said to have a "flat response", meaning that they attenuate all wavelengths of light over their usable spectral range by the same amount. Attenuation filters are used over a photosensitive surface when the light signal received is too intense. An example of this application is a light signal being measured by a photo detector. If the photo detector is responding linearly, the insertion of a 50% attenuation filter in the light beam should cause a 50% reduction in the output electrical signal.

There are two basic classes of attenuation filters, including geometric filters and neutral-density filters. Geometric filters, such as iris diaphragms or screen or mesh filters, physically block a fraction of an aperture through which the light beam passes. Neutral-density (ND) filters are uniform, "grey" filters that absorb and/or reflect a fraction of the energy incident upon them. The term "neutral" is designated because the absorption and/or reflection characteristics of the filter are constant over a wide wavelength range. Several types of neutral-density filters are available, including plastic or gelatin filters, absorbing glass, and metallic film on glass.

Another variant of a ND filter is a filter wheel which is adapted to continuously vary the intensity of the light beam. A filter wheel typically has a number of specific band rejection filters that are selected to block the incident light source. The number of specific filters must be a balance between the width of the rejection band and the size of the filter wheel that the package can accommodate. Typically, the number of filters is kept to two or three so the wheel size can be kept small, which means that the rejection bands must be wide to cover all wavelengths. This wide rejection band will attenuate up to half of the light the system uses to see, and thus, decrease functionality of the system overall while contrast may still be compromised due to low light.

Another classification of filters are wavelength-selective filters. Wavelength-selective filters are used to produce or select specific color or a band of color from a white light source, to isolate a specific wavelength, or to reject a specific wavelength or band of wavelengths. There are three general classes of wavelength-selective filters, including cut-off filters, bandpass filters, compensating filters, and notch or minus filters.

Cut-off filters have an abrupt division between regions of high and low transmission. If a filter transmits the shorter wavelengths, it is called a short-wave-pass filter or a low-frequency-pass filter. If a filter transmits the longer wavelengths and rejects the shorter wavelengths, it is called a long-wave-pass-filter or high-frequency-pass filter. Bandpass filters can be produced that transmit only a very narrow wavelength range. For instance, one important application of such filters in electro-optics is the isolation of individual laser lines. Compensating filters are designed to have gradually sloping spectral curves.

Other types of filters, such as narrow bandpass filter (e.g., crystal tunable filters), have been implemented for tunable band rejection as well. These filters work via polarization rather than interference and have properties that are easier to vary than a typical interference filter. For instance, the liquid crystal sits between two linear polarizers and can be electrically tuned to rotate the polarization of a specific narrow band of frequencies to cause the second linear polarizer to block those wavelengths. Currently, these types of filters can operate from the visible through short wave infrared bands.

Finally, interference filters may also be used for wavelength selection when a sharp cut-off or very narrow bandpass is required. Interference filters are generally made by depositing multiple alternating layers (thin coatings) of dielectric materials on a dielectric substrate or transparent substrate, such a glass or quartz window. Selection of materials and thickness of the coating are chosen to provide reflection or transmission at the desired wavelengths. When the number of layers is increased, the cut-off or the passband typically becomes sharper. An interference filter may have as many as 100 layers of coatings. These multilayer coating techniques are the same as are used to produce high-reflective laser mirrors. Absorption and scattering from these surfaces is typically less than 1%. Consequently, when these coatings are used as filters, practically all of the light is either transmitted or reflected. The spectral transmittance performs the filtering action. Also, since the transmitted beam shows negligible distortion from the interference coating, these filters can be used in imaging systems.

It would be beneficial to utilize one or a combination of the aforementioned filters to selectively attenuate unwanted bright sources in electronic imaging systems, especially with imaging systems which have high optical gain. Some of the primary design parameters that must be considered in providing a solution to help restore contrast include the attenuation and/or filtering characteristics of the specific filter design, hardware implementation, and ability to automate, to name a few. Ideally, it would be advantageous to provide a system which is capable of selectively attenuating both the broadband and narrowband bright sources. However, with the current state of technology, such a solution could prove too complex and/or costly to be feasible. In the alternative, is would be quite beneficial and useful to provide a solution which is useful for selectively attenuating the narrowband sources so that contrast can be restored to imaging systems in a manner better than the prior art systems provide.

BRIEF SUMMARY OF THE INVENTION

The present invention is intended to overcome and solve the aforementioned problems commonly encountered in the attenuation of bright sources. Furthermore, the present invention provides better performance characteristics than any previously known or published approaches.

Accordingly, an exemplary method is provided for selectively attenuating narrowband high intensity bright sources from an incoming light source in an imaging system creating a focal plane array. The method includes receiving and conditioning incoming light into at least one of a first or second group of optics (or both); receiving the light into a line attenuation tunable optical filter (LATOF) adapted to tilt, wherein the LATOF creates a rejection band; tilting the LATOF at least one increment to selectively attenuate the bright sources from the receive conditioned light; receiving conditioned and selectively attenuated light into an opto-electronic detector; and converting the light into an output for an electronic image, wherein saturation of the focal plane array decreases and contrast is restored in the electronic image.

According to another aspect of the exemplary method, as the angle of tilting of the LATOF increases relative to incident incoming light, a center wavelength of the rejection band is shifted to shorter wavelengths; and, as the angle of tilting of the LATOF decreases relative to incident incoming light, a center wavelength of the rejection band is shifted to longer wavelengths.

According to another aspect of the exemplary method, the method may further comprises continuously adjusting the tilt angle of the LATOF such that spectral blocking of the narrowband high intensity bright source from the incoming light is continuously adjusted, and as a result, contrast is continuously maintained. The method may also include utilizing a plurality of LATOF's having different rejection bands such that tuning may be accomplished over a wider spectral range. Additionally, the method may also include tilting the LATOF until the narrowband high intensity bright source of light is selectively attenuated. Moreover, the method may also include checking whether the bright source has been sufficiently attenuated.

Additionally, in another aspect of the exemplary method, the method may further comprise tilting the LATOF again at least one increment to selectively attenuate the bright sources from the receive conditioned light. Moreover, the method may further comprise verifying that the bright source has been sufficiently attenuated; waiting for a predetermined time period to elapse; and checking again the whether the bright source has been sufficiently attenuated.

According to another embodiment of the present invention, an imaging system is provided which includes an automated feature for selectively attenuating narrow band high intensity bright sources of light and restoring contrast. Preferably, the imaging system comprises at least one of first or second group of conditioning optics (or both) adapted to receive incoming light; a line attenuation tunable optical filter (LATOF) mounted to a tilt mechanism, the LATOF adapted to selectively attenuated a narrowband of light; a opto-electronic detector adapted to receive the conditioned and selectively attenuated light; a bright source detector adapted to receive an image from the opto-electronic detector; drive electronics for actuating the tilt mechanism; and control logic being at least one of embedded in hardware or coded in software. Preferably, the LATOF comprises an interference filter having multilayer interference coatings.

And yet another embodiment of the present invention provides an imaging system having a manually operated feature for selectively attenuating narrow band high intensity bright sources of light and restoring contrast. The imaging system preferably comprises either first or second group of conditioning optics (or may include both) adapted to receive incoming light; a line attenuation tunable optical filter (LATOF) on a tilt mechanism, the LATOF adapted to selectively attenuate the light; an opto-electronic detector adapted to receive conditioned and selectively attenuated light from the second group of conditioning optics; a monitor for displaying the image adapted to receive electronic signals representative of the light signal from the opto-electronic detector; drive electronics for actuating the tilt mechanism; and a user tilt control for manually controlling the drive electronics.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

An Exemplary Line Attenuation Tunable Optical Filter (LATOF)

According to a first aspect of the present invention, a tiltable line attenuation tunable optical filter [also hereinafter "LATOF"] 2 is provided which may adapted to be utilized in various forms of electronic imaging systems. In a preferred embodiment, the LATOF 2 is an interference filter having multiple layers and/or alternating layers (thin coatings) of dielectric materials depositing on one of a glass or quartz window. Selection of the materials and thickness of the coating may be chosen to provide reflection or transmission at the desired wavelengths. For instance, typically when the number of layers is increased, the cut-off or the passband becomes sharper, but the peak transmittance also decreases. Absorption and scattering from the coated surfaces is typically less than 1%. Consequently, when these coatings are used as filters, practically all of the light is either transmitted or reflected. Hence, the reflective and transmissive properties constitute the filter. Since the transmitted beam shows negligible distortion from the interference coating, the LATOF 2 interference-type can be used in imaging systems.

Normally, an interference filter is designed to be used at a 0 degree angle of incidence. The spectrophotometric curve of these filters can be shifted to longer or shorter wavelengths about the wavelength domain by varying the temperature and/or the angle of incidence at which they are used. To a lesser extent, the shape of the curve also is altered by these variations. The LATOF 2 of the present invention takes advantage of the fact that interference filters shift their operating spectrum about the wavelength domain when the angle of incidence of the incoming light changes. With proper application of multi-layer interference coatings, a narrow band rejection filter can be designed that has angle of incidence sensitivity sufficient to continuously tune the rejection center wavelength over a range in excess of 15% change from the original center wavelength. In one exemplary mode, the aforementioned may be accomplished by using a material combination with a low refractive index contrast to the narrow band, high order layer thickness to further narrow, and low absolute refractive index for both materials to get the proper amount of angular shift.

Figures 1A, 1B:
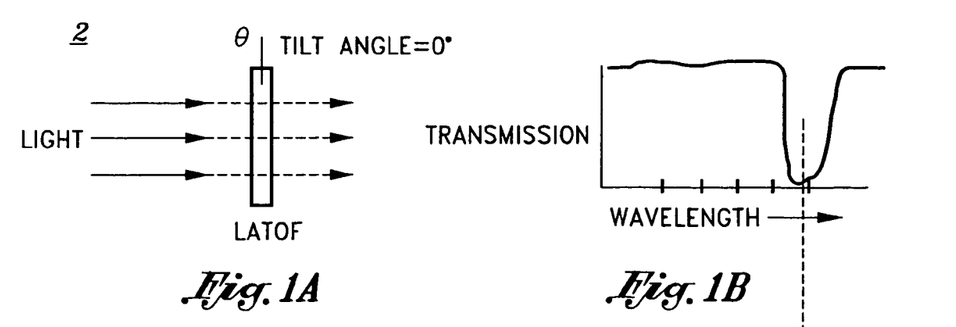
FIG. 1A depicts a tiltable line attenuation tunable optical filter (LATOF) having a tilt angle of 0 degrees, according to an aspect of the present invention.
FIG. 1B shows a plot comparing transmission of light verses wavelength as a function of the LATOF from FIG. 1A having a tilt angle of 0 degrees, according to an aspect of the present invention.

The following paragraphs will now describe an exemplary LATOF 2 which may be utilized within various embodiments of imaging systems, and the selective attenuation effects of the same, according to an aspect of the present invention. FIG. 1A depicts the LATOF 2 with a tilt angle of θ of 0 degrees; while FIG. 1B shows a plot comparing transmission of light verses wavelength as a result of being filtered through the LATOF 2 from FIG. 1A having a tilt angle θ of 0 degrees, according to an aspect of the present invention. From the aforementioned Figures, it can be observed that the LATOF 2 creates a narrow bandwidth region in which the light source is substantially attenuated.

Figures 2A, 2B:
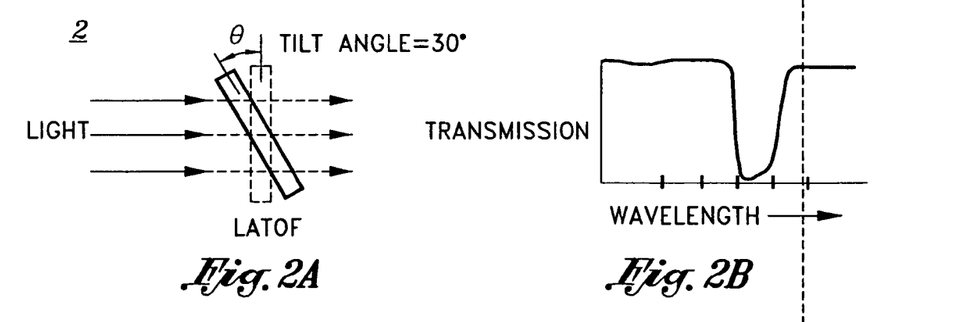
FIG. 2A depicts the LATOF having a tilt angle of 30 degrees, according to an aspect of the present invention.
FIG. 2B shows a plot comparing transmission of light verses wavelength as a function of the LATOF from FIG. 2A having a tilt angle of 30 degrees, according to an aspect of the present invention.

FIG. 2A depicts the LATOF 2 arranged at a tilt angle of 30 degrees; while FIG. 2B shows a plot comparing transmission of light verses wavelength as a result of being filtered through the LATOF 2 from FIG. 2A having a tilt angle of 30 degrees, according to an aspect of the present invention. From the aforementioned Figures, it is observed that the narrow bandwidth region moves to the left on the wavelength domain, indicating that the wavelengths of the attenuated region are now shorter as a result of the tilt angle of the LATOF 2 being adjusted to 30 degrees.

Figures 3A, 3B:
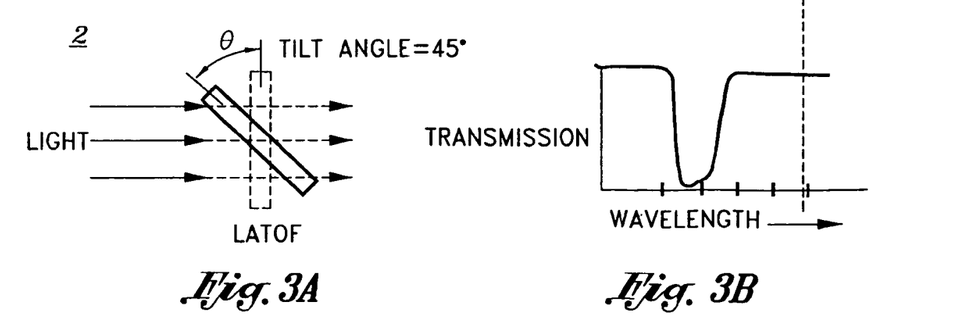
FIG. 3A depicts the LATOF having a tilt angle of 45 degrees, according to an aspect of the present invention.
FIG. 3B shows a plot comparing transmission of light verses wavelength as a function of the LATOF from FIG. 3A having a tilt angle of 45 degrees, according to an aspect of the present invention.

FIG. 3A depicts the LATOF 2 arranged at a tilt angle of 45 degrees; while FIG. 3B shows a plot comparing transmission of light verses wavelength as a result of being filtered through the LATOF from FIG. 3A having a tilt angle of 45 degrees, according to an aspect of the present invention. From the aforementioned Figures, it is observed that the narrow bandwidth region moves to the left on the wavelength domain, indicating that the wavelengths of the attenuated region are now shorter as a result of the tilt angle of the LATOF 2 being adjusted an additional 15 degrees.

An exemplary implementation of the present invention would be to install a tilt adjustable mount with the LATOF 2 into an imaging system. As the angle of the filter increases, the center of the wavelength of the rejection band will shift to shorter wavelengths. Once the rejection band is tilt-tuned to match the source's spectrum, the saturation of the focal plane array will decrease sufficiently that contrast can be restored. It is further envisioned that multiple or a plurality tilt-tuned filters (e.g., LATOF's) with different rejection bands could be installed for tuning over a wider range or give polarization insensitivity and aberration control. As a result, the present invention creates a continuous adjustment feature which is capable and adapted to spectrally block unwanted bright sources with a much more narrower blocking band than the prior art, so that a much smaller portion of the incoming light signal is blocked. Further, the opto-electronic detector still receives most of the original incoming light signal, while providing better contrast for the overall scene.

Other Design Considerations for an Exemplary LATOF

One aspect of the present invention allows the high rejection zone of the filter to be "stowed" outside the optical system's nominal transmission band. This allows the filter to have minimal impact on the system when no bright source is present. In particular, the high rejection zone of the LATOF 2 may be stowed in an atmospheric absorption band or a non-operating spectrum of the imaging system. For instance, the atmospheric absorption band for water (which includes 1.4 µm, 1.9, µm, 2.8 µm, 6.0 µM or in the range of 25-100 µm) can be used to stow the high rejection zone of the LATOF 2. Similarly, the atmospheric absorption bands for oxygen (0.19 µm), ozone (9.4-10.2 µm, 11.7-15.4 µm), carbon dioxide (3.3-4.4 µm), hydrocarbons (3.8 µm), nitrous oxide (4.22-4.73 µm, 7.53-8.9 µm, 15-19 µm) and methane (5.91-9.1 µm) may also be used to stow the high rejection zone of the LATOF filter 2 outside the optical system's nominal transmission band.

Figure 4:
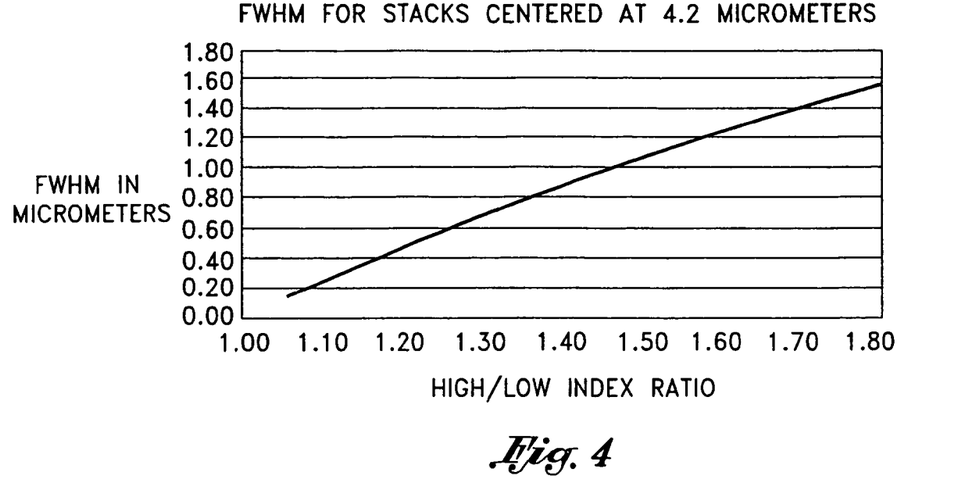
FIG. 4 shows the Full-Width Half Maximum (FWHM) of a reflector stack built with different refractive index contrast ratios, according to an aspect of the present invention.

FIG. 4 shows the Full-Width Half Maximum (FWHM) of a reflector stack built with different refractive index contrast ratios, according to an aspect of the present invention. FWHM is used to describe a measurement of the width of an object in a picture, when that object does not have sharp edges. This occurs when the width across the profile drops to half of its peak, or maximum value. This is considered the full width of the image at half maximum value, or Full-Width Half-Maximum (FWHM). It is a simple and well-defined number which can be used to compare the quality of images obtained under different observing conditions.

In particular, FIG. 4 shows the atmospheric band being approximately 0.2 µm wide. From FIG. 4 it can be seen that an index contrast ratio of about 1.08 is preferred. The combinations of ZnSe/ZnS and $Ta_2O_5/HfO_2$ both have index ratios close to this number and can be made transparent at these wavelengths; however the requirement that the reflectance zone move to shorter wavelengths by about 18% with a reasonable amount of tilt indicates the use of lower refractive index materials. High refractive index layers have a limited amount of angular shift available. Because the shift comes from a $\cos \theta_{refracted}$ term in the phase thickness of the layer and the refracted angle in a high index layer is closer to its maximum and has less room to grow, neither of these material combinations will cover the full spectral range with the same angular tilt as a lower refractive index combination. $Al_2O_3/SiO_2$, while somewhat higher in index contrast (~1.11) will cover more of the range required.

Figure 5A:
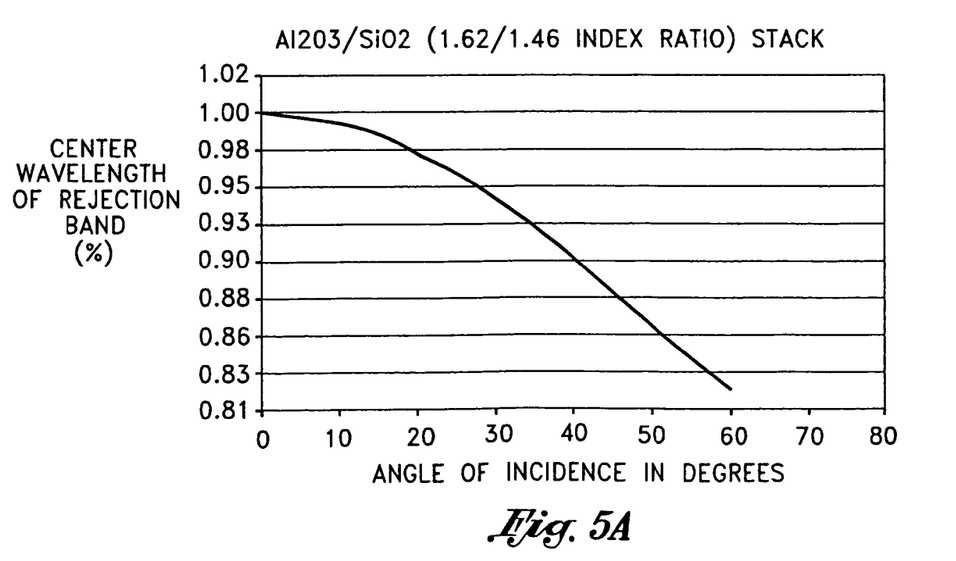
FIG. 5A shows a plot comparing the center wavelength of rejection to the angle of incidence in degrees for an exemplary coating design, according to an aspect of the present invention.

FIG. 5A shows a plot comparing the center wavelength of rejection to the angle of incidence in degrees for an exemplary coating design, according to an aspect of the present invention. As is indicated in the plot, as the angle of incidence is increased, the center wavelength of rejection decreases. As can be seen from FIG. 5A the spectral shift vs. angle for an $Al_2O_3/SiO_2$ stack starts relatively slowly due to the $\cos \theta_{refracted}$ term, therefore, the normal operating position of the LATOF filter will be at about 12° angle of incidence, the start of the more linear portion of the operating curve.

Figure 5B:
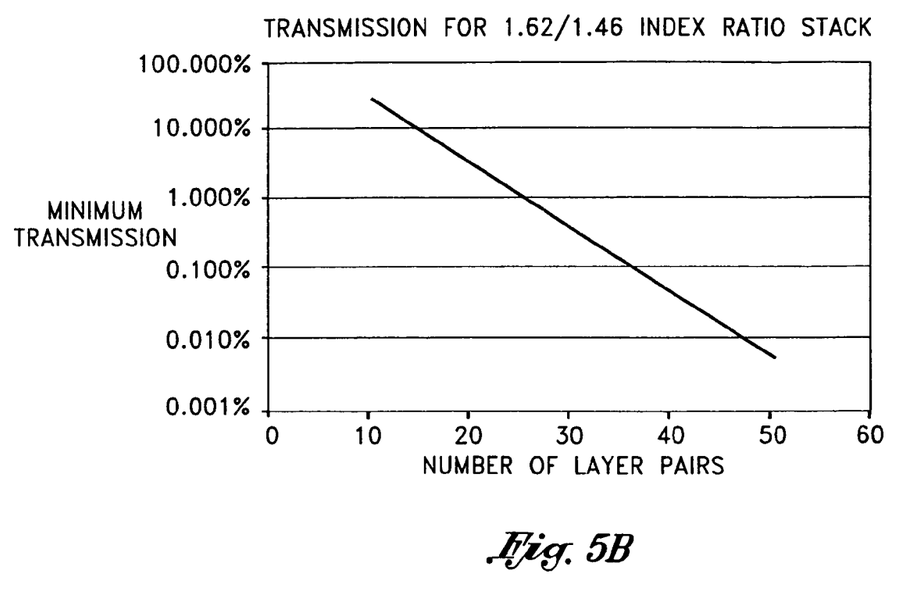
FIG. 5B shows a plot comparing minimum transmission to the number of layer pairs for an exemplary coating, according to an aspect of the present invention.

FIG. 5B shows a plot comparing minimum transmission to the number of layer pairs for an exemplary coating, according to an aspect of the present invention. The low refractive index contrast indicates that more layers must be used in order to achieve the required reflectivity. In order to narrow the bandwidth below what the index contrast for a quarterwave stack allows, it is possible to use layers that are three quarterwave lengths thick, in combination with the requirements on number of layers to achieve reflectivity mean that result from extremely thick coatings. To alleviate some of the problems with thick coatings, a mixed thickness design may be implemented, with only one of the materials being three quarter-waves thick, leaving the other as a single quarterwave. This still reduces the bandwidth. The coating can also be broken up between two surfaces, to restrict the amount of coating needing to be deposited in any one run. Finally, in order to alleviate stress build up in the coating, these coatings may be deposited via an energetic deposition technique, such as ion assisted deposition (IAD) or ion beam sputtering (IBS) which will yield a net compressive stress, which is much more resistant to adhesion failure that purely evaporated coatings which have net tensile stress. These deposition techniques are the preferred method to provide low loss layers in these wavelength ranges.

Other coatings can be designed to create rejection bands for other spectra. Similar choices of material refractive index contrast may be made to get angular shifts on the order of 15%. In one instance, where $Al_2O_3/SiO_2$ begins to lose transparency in a range, alternative material combinations may be implemented/utilized. One possibility for slightly longer wavelengths is $PbF_2/ThF_4$ (1.72/1.5) deposited via ion assisted deposition to overcome tensile stress cracking problems. One additional problem is that since the index ratio is similar then a similar approach to band narrowing is appropriate. However, since the stack is at a longer wavelength, a second order harmonic peak is now present inside a typical mid-wave infrared passband where it can interfere with the nominal system transmission. Such affects can be partially alleviated by making all the layers ¾ wave thick. This pushes the harmonic to ⅗ of the design wavelength safely out of the transmission band.

An alternate approach is to use rugate filter technology, where the refractive index of the film smoothly varies (typically sinusoidally) rather than abruptly changing as in a conventional coating. This smooth variation has the effect of suppressing all higher order harmonic peaks, and gives very good transmission on both sides of the rejection zone. Using this technique requires a material which changes it's index by a ratio similar to the material system considered with a controllable compositional change.

If the attenuation at short wavelengths in either band is inadequate, or materials with higher refractive index and smaller consequent angle shift must be used, this can be alleviated by using the inverse of the filters described above. A reflector stack may be provided whose normal operating position is at a high angle of incidence, with the reflector centered just at the short wavelength edge of the transmission band. If attenuation is required in the shorter wavelengths of the pass band, then the angle of this filter could be decreased, and the filter rejection band would move into wavelengths of the passband.

The following sections of the specification will now describe exemplary various embodiments of the present invention which incorporate the LATOF 2 into exemplary imaging systems. Furthermore, control logic solutions that may be utilized in combination with the imaging systems are further disclosed and discussed.

First Embodiment of LATOF Imaging System w/ an Automated Control Loop

Figure 6A:
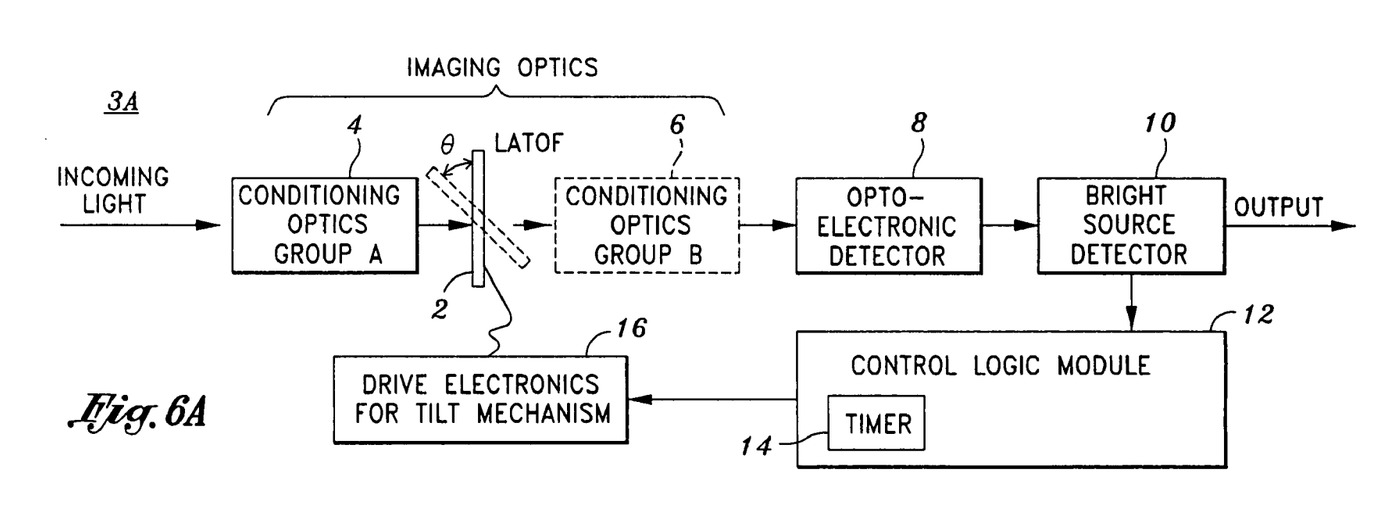
FIGS. 6A-B depict an exemplary imaging system which utilizes an LATOF in conjunction with an automated control loop, according to an aspect of the present invention.
Figure 6B:
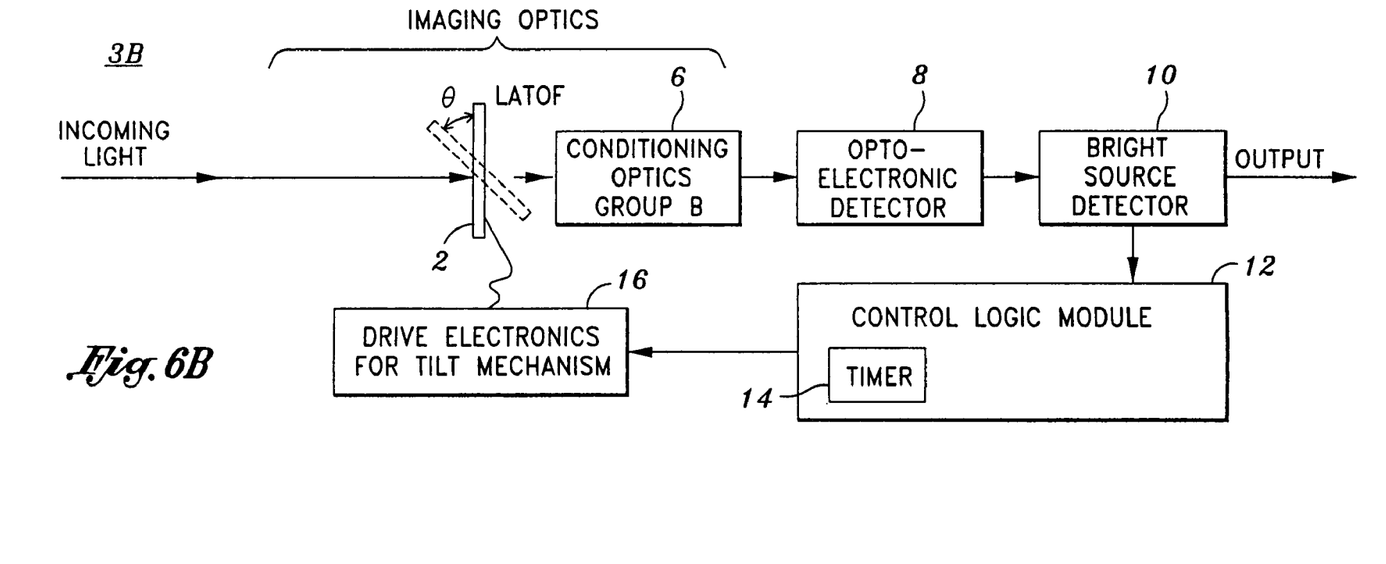

FIGS. 6A-B depict various configurations of a first embodiment imaging system 3A or 3B with an automated control loop, according to an aspect of the present invention. The imaging system 3A or 3B preferably includes a Line Attenuation Tunable Optical Filter 2 positioned: (1) either behind a first Group A of conditioning optics (reference numeral 4); (2) in-front of a second group A of conditioning optics (reference numeral 6); or (3) between a first Group A of conditioning optics (reference numeral 4) and a second Group B of conditioning optics (reference numeral 6). An opto-electronic detector 8 and bright source detector 10 are positioned downstream of the second Group B of conditioning optics, in respective order. The imaging system 3 further includes a control logic module and/or software 12 which has an integrated timer 14. Also, drive electronics 16 are provided for a tilting mechanism feature adapted to tilt the LATOF 2.

One variant/configuration of the first embodiment of the imaging system 3A, is shown in FIG. 6A, where incoming light is first received by the first Group A of conditioning optics adapted to deliver a set field of view. Next, the light conditioned by Group A is then conditioned by the LATOF 2, in the manner which has been discussed and illustrated by FIGS. 1A through 3B. Next, the light conditioned by the LATOF 2, is either received in an opto-electronic detector 8 where the light is converted into electronic pixel signals; or then conditioned by the second Group B of conditioning optics adapted to deliver a set field of view. After the incoming light has been conditioned by the aforementioned components (Group A and/or Group B; and LATOF 2), it is then received in an opto-electronic detector 8 wherein the light is converted into electronic pixel signals. Finally, after the light has been converted into electronic pixel signals, the bright source detector 10 detects areas of the electronic image that exceed acceptable brightness levels.

Another variant/configuration of the first embodiment of the imaging system 3B, is shown in FIG. 6B. In this configuration, the LATOF 2 is positioned in front of the first Group B of conditioning optics adapted to deliver a set field of view. Next, the light conditioned by the LATOF 2, is received in an opto-electronic detector 8 where the light is converted into electronic pixel signals. Finally, after the light has been converted into electronic pixel signals, the bright source detector 10 detects areas of the electronic image that exceed acceptable brightness levels.

FIG. 6 further depicts the control loop of the first exemplary LATOF imaging system 3, which may include (but is not limited thereto) bright source detector 10, control logic module or software 12, timer 13 and drive electronics for the tilting mechanism 16, according to an aspect of the present invention. The control loop of the present invention creates continuous adjustment capabilities so that the same spectral blocking of the bright source can be done with a much narrower blocking band, and so that a much smaller portion of the incoming light signal is blocked. This means that the opto-electronic detector 8 still gets most of its signal and better contrast for the overall scene will result.

Figure 7:
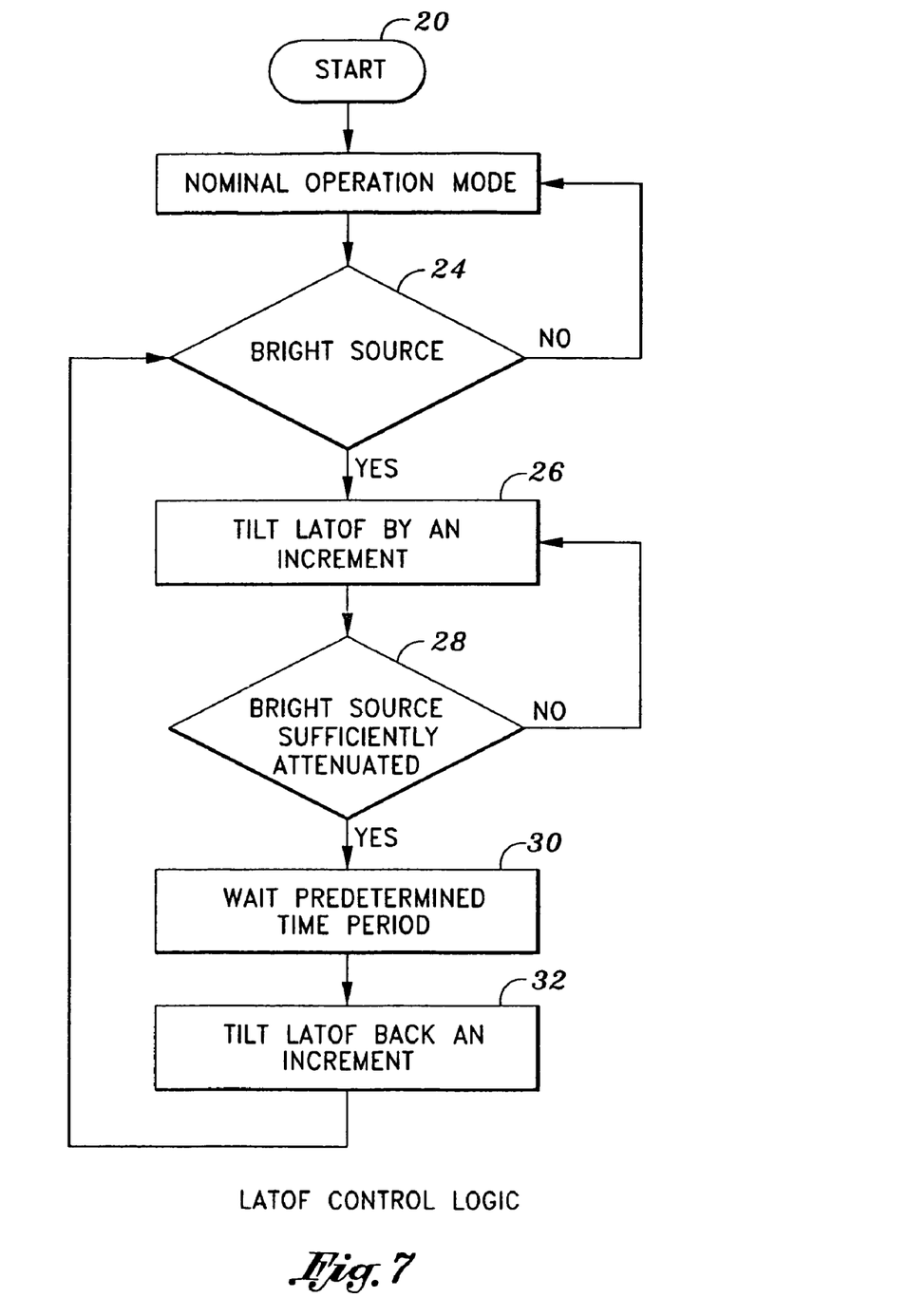
FIG. 7 provides a flow diagram of the control logic which may be utilized in the imaging system with the automated control loop from FIG. 6, according to an aspect of the present invention.

FIG. 7 provides a flow diagram of exemplary control logic that may be utilized in the first exemplary LATOF imaging system 3 with the automated control loop from FIG. 6, according to an aspect of the present invention. The logic may be embedded in hardware or software within the imaging system 3. For example, the logic may be included in the control logic module 12 as shown in FIGS. 6A-B.

At step 20, the control logic is initiated where it is assumed the imaging system 3 has been powered-up and is operating in a nominal state. At step 22, a nominal operational monitoring mode is activated. Here the exemplary imaging system 3 is assumed to be operating in a nominal state or mode. Once the imaging system 3 is operational in a nominal state or mode, a check is made to determine whether a bright source is present at step 24. A predetermined threshold measurement may be utilized to determine whether the light source is considered to have a bright source or not. For example, at step 24, if it is determined that a bright source is not present, then the logic returns back to the nominal operation monitoring mode at step 22 where the logic continues to monitor the light source for a bright source. At step 24, if it is determined that the light source does have a bright source, then the LATOF 2 is tilted by a predetermined increment at step 26. Next at step 28, a check is made to determine whether the bright source has been sufficiently attenuated. If not, the logic returns to step 26 where the LATOF 2 is tilted again in the same direction by another increment. If at step 26 it is determined that the bright source has been sufficiently attenuated, then at step 30 the logic waits a predetermined time period at step 30. After the predetermined time period has elapsed, at step 32, the LATOF 2 is tilted back an increment at step 32. Finally, the logic returns back to step 24 where a bright source check is performed again.

Alternative Exemplary Embodiment of LATOF Imaging System w/ Manual Tile Control

Figure 8A:
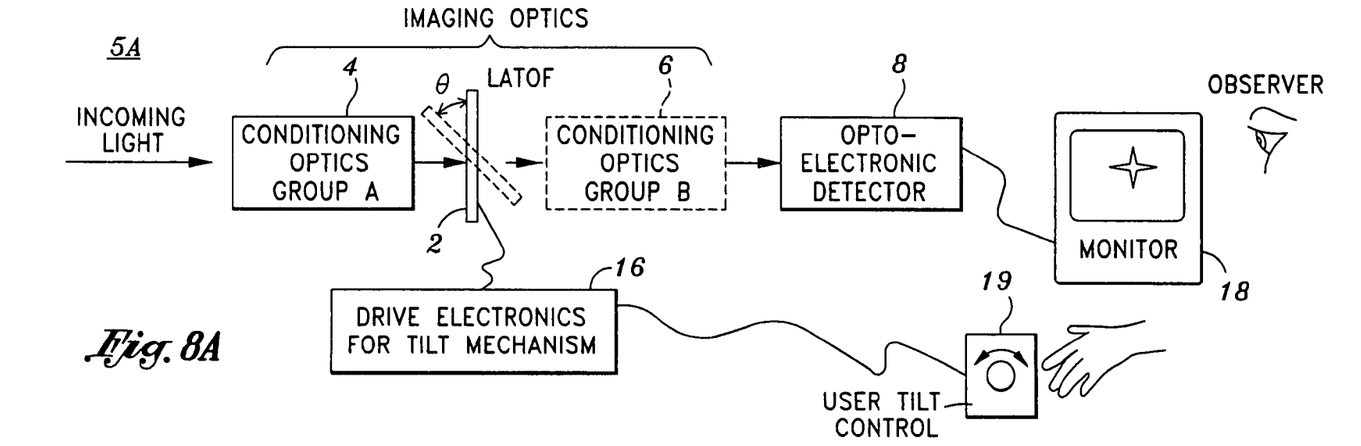
FIGS. 8A-B depict an exemplary imaging system which utilizes an LATOF in conjunction with a manually controlled tilt control, according to an aspect of the present invention.
Figure 8B:
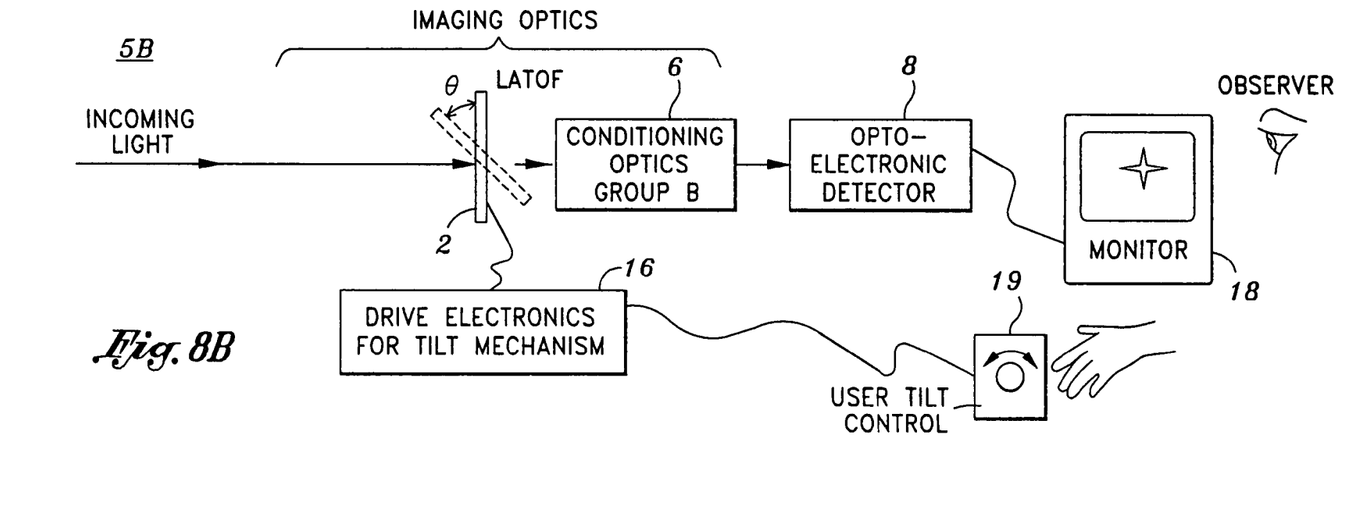

FIGS. 8A-B depict an exemplary imaging system 5A or 5B, is similar to that of the first exemplary embodiment of the imaging system 3, except with a manually controlled tilt control feature 19, according to an aspect of the present invention. The imaging system 5A preferably includes a Line Attenuation Tunable Optical Filter 2 positioned between a first Group A of conditioning optics (reference numeral 4) and a second Group B of conditioning optics (reference numeral 6). However, a variant of the imaging system 5A does not include the second Group B conditioning optics. An opto-electronic detector 8 is positioned downstream of the second Group B of conditioning optics, if Group B optics are included, or behind LATOF 2, if Group B optics are not included. The system further includes a monitor 18 which displays an image. Drive electronics 16 are provided for the tilting mechanism feature of the LATOF 2 and a manual control 19 is provided for controlling the drive electronics 16.

One variant of the alternative embodiment 5A is shown in FIG. 8A, where incoming light is first received by the first Group A of conditioning optics. Next, the light conditioned by group A is then conditioned by the LATOF 2, as has been discussed and illustrated by FIGS. 1A through 3B. Next, the light conditioned by the LATOF 2, is then conditioned by the second Group B of conditioning optics. However, as noted above, another variant of the alternative embodiment 5A doe not include the second Group B of conditioning optics. After the incoming light has been conditioned by the aforementioned components, it is then received in an opto-electronic detector 8 wherein the optical light is converted into electronic pixel signals. Finally, after the light has been converted into electronic pixel signals, the light source, which may include a bright source, is displayed on the monitor 18. With this instant system, the operator/observer is able to operate the user tilt control 19 to filter out substantial portions of the bright source. For instance, when the observer sees a high-intensity bright source in the image created via the 18, the observer can adjust the tilt control 19 until the high-intensity bright source is eliminated and normal contrast is restored.

Another variant of the alternative embodiment 5B is shown in FIG. 8B, where incoming light is first received by the LATOF 2. Next, the light conditioned by the LATOF 2, is then conditioned by the second Group B conditioning optics. After the Group B conditioning optics has conditioned the incoming light, it is then received in an opto-electronic detector 8 wherein the optical light is converted into electronic pixel signals. Finally, after the light has been converted into electronic pixel signals, the light source, which may include a bright source, is displayed on the monitor 18. With this instant system, the operator/observer is able to operate the user tilt control 19 to filter out substantial portions of the bright source. For instance, when the observer sees a high-intensity bright source in the image created via the 18, the observer can adjust the tilt control 19 until the high-intensity bright source is eliminated and normal contrast is restored.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and such uses are within the scope of the appended claims.

What is claimed is:

1. A method for selectively attenuating narrowband high intensity bright sources from an incoming light source in an imaging system creating a focal plane array, the method comprising:
   receiving and conditioning incoming light in a first group of conditioning optics;
   receiving conditioned light from the first group of optics into a tiltable line attenuation tunable optical rejection filter (LATOF), wherein the LATOF creates a rejection band which selectively attenuates a narrowband of bright source from the conditioned light;
   tilting the LATOF at least one increment to tune the rejection band along a wavelength domain;
   receiving the conditioned and selectively attenuated light from the LATOF into an opto-electronic detector; and
   converting the conditioned and selectively attenuated light into an output for an electronic image,
   wherein saturation of the focal plane array decreases and contrast is restored in the electronic image; and
   tilting the LATOF such that unattenuated light from the high intensity bright sources, and the conditioned light, are simultaneously received by the detector.

2. The method according to claim 1, further comprising receiving the conditioned and selectively attenuated light from the LATOF in a second group of conditioning optics before the opto-electronic detector receives the conditioned and attenuated light.

3. The method according to claim 1, wherein as the angle of tilting of the LATOF increases relative to incident incoming light, a center wavelength of the rejection band is shifted to shorter wavelengths along the wavelength domain.

4. The method according to claim 1, wherein as the angle of tilting of the LATOF decreases relative to incident incoming light, a center wavelength of the rejection band is shifted to longer wavelengths along the wavelength domain.

5. The method according to claim 1, further comprising continuously adjusting the tilt angle of the LATOF such that spectral blocking of the narrowband high intensity bright source from the incoming light is continuously optimized, and as a result, contrast is continuously maintained.

6. The method according to claim 1, further comprising utilizing a plurality of LATOF's having different rejection bands such that tuning may be accomplished over a wider spectral range, while polarization insensitivity and aberration control may be increased.

7. The method according to claim 1, tilting the LATOF until the narrowband high intensity bright source of light is selectively attenuated.

8. The method according to claim 7 further comprising checking the whether the bright source has been sufficiently attenuated.

9. The method according to claim 8 further comprising tilting the LATOF again at least one increment until the bright sources are selectively attenuated from the light.

10. A method for selectively attenuating narrowband high intensity bright sources from an incoming light source in an imaging system creating a focal plane array, the method comprising:
    receiving incoming light into a tiltable line attenuation tunable optical rejection filter (LATOF), wherein the LATOF creates a rejection band which selectively attenuates a narrowband of bright source from the conditioned light;
    tilting the LATOF at least one increment to selectively attenuate the bright source from the incoming light;
    receiving the selectively attenuated light from the LATOF into a group of conditioning optics positioned behind the LATOF;
    receiving conditioned light from the group of conditioning optics into an opto-electronic detector; and
    converting the selectively attenuated light into an output for an electronic image,
    wherein saturation of the focal plane array decreases and contrast is restored in the electronic image; and
    tilting the LATOF such that unattenuated light from the high intensity bright sources, and the conditioned light, are simultaneously received by the detector.

11. An imaging system having an automated feature for selectively attenuating narrow band high intensity bright sources of light and restoring contrast, the imaging system comprising:
    a first group of conditioning optics adapted to receive incoming light;
    a tiltable line attenuation tunable optical rejection filter (LATOF) adapted to receive conditioned light from the first group of conditioning optics;
    an opto-electronic detector adapted to receive selectively attenuated light from the LATOF;
    a bright source detector adapted to receive an image from the opto-electronic detector;
    drive electronics for tilting the LATOF; and
    control logic being at least one of embedded in hardware or coded in software for controlling the tilting of the LATOF;
    wherein the LATOF is tiltable such that unattenuated light from the high intensity bright sources, and the conditioned light, pass through the LATOF and are simultaneously received by the detector.

12. The imaging system according claim 11, further including a second group of conditioning optics adapted to receive attenuated light from the LATOF.

13. The imaging system according to claim 11, the LATOF comprising an interference filter having multilayer interference coatings.

14. An imaging system having a manually operated feature for selectively attenuating narrow band high intensity bright sources of light and restoring contrast, the imaging system comprising:
    a first group of conditioning optics adapted to receive incoming light;
    a line attenuation tunable optical rejection filter (LATOF) on a tilt mechanism, the LATOF adapted to receive conditioned light from the first group of conditioning optics;
    an opto-electronic detector adapted to receive conditioned and selectively attenuated light from the LATOF and to further convert the light into an electronic signals for an image;
    a monitor for displaying the image;
    drive electronics for actuating the tilt mechanism; and a user tilt control for manually controlling the drive electronics:

wherein the LATOF is tiltable such that unattenuated light from the high intensity bright sources, and the conditioned light, pass through the LATOF and are simultaneously received by the detector.

15. The method according to claim 1, further comprising stowing a high reflection zone of the LATOF in one of an atmospheric absorption band or a non-operating spectrum of the imaging system.

16. The method according to claim 10, further comprising stowing a high reflection zone of the LATOF in one of an atmospheric absorption band or a non-operating spectrum of the imaging system.

17. The imaging system according to claim 11, further comprising stowing a high reflection zone of the LATOF in one of an atmospheric absorption band or a non-operating spectrum of the imaging system.

18. The imaging system according to claim 14, further comprising stowing a high reflection zone of the LATOF in one of an atmospheric absorption band or a non-operating spectrum of the imaging system.

19. A method for selectively attenuating narrowband high intensity bright sources from an incoming light source in an imaging system creating a focal plane array, the method comprising:

receiving incoming light into a tiltable line attenuation tunable optical rejection filter (LATOF), wherein the LATOF creates a rejection band which selectively attenuates a narrowband of bright source from the conditioned light;

tilting the LATOF at least one increment to selectively attenuate the bright source from the incoming light;

receiving the selectively attenuated light from the LATOF into a group of conditioning optics positioned behind the LATOF;

receiving conditioned light from the group of conditioning optics into an opto-electronic detector, a peak brightness band being identifiable from an output from the opto-electronic detector and corresponding to the narrowband of bright source, the LATOF rejection band being tuned to the peak brightness band; and converting the selectively attenuated light into an output for an electronic image, wherein saturation of the focal plane array decreases and contrast is restored in the electronic image; and tilting the LATOF such that unattenuated light from the high intensity bright sources, and the conditioned light, are simultaneously received by the detector.

20. The method according to claim 19, further comprising continuously adjusting the tilt angle of the LATOF such that spectral blocking of the narrowband high intensity bright source from the incoming light is substantially optimized on a continuous basis, and as a result, contrast is continuously maintained.

21. The method according to claim 19, further comprising utilizing a plurality of LATOF's having different rejection bands such that tuning may be accomplished over a wider spectral range, while polarization insensitivity and aberration control may be increased.

22. The method according to claim 19, tilting the LATOF until the narrowband high intensity bright source of light is selectively attenuated.

23. The method according to claim 22 further comprising checking the whether the bright source has been sufficiently attenuated.

24. An imaging system having an automated feature for selectively attenuating narrow band high intensity bright sources of light and restoring contrast, the imaging system comprising:

a first group of conditioning optics adapted to receive incoming light;

a tiltable line attenuation tunable optical rejection filter (LATOF) adapted to receive conditioned light from the first group of conditioning optics;

an opto-electronic detector adapted to receive selectively attenuated light from the LATOF;

a bright source detector adapted to receive an image from the opto-electronic detector and identify a peak brightness band corresponding to the narrow band high intensity bright sources of light;

drive electronics for tilting the LATOF; and control logic being at least one of embedded in hardware or coded in software for controlling the tilting of the LATOF by the drive electronics in response to the identified peak brightness band;

wherein the LATOF is tiltable such that unattenuated light from the high intensity bright sources, and the conditioned light, pass through the LATOF and are simultaneously received by the detector.

* * * * *